2,993,767
METHOD OF BONDING SOLID OXIDIZER PARTICLES TOGETHER TO MANUFACTURE PROPELLANT CHARGES
Walter G. Berl, Washington, D.C., and Daniel W. Dembrow, Greenbelt, Md., assignors to the United States of America as represented by the Secretary of the Navy
Filed Dec. 11, 1953, Ser. No. 397,804
1 Claim. (Cl. 52—.5)

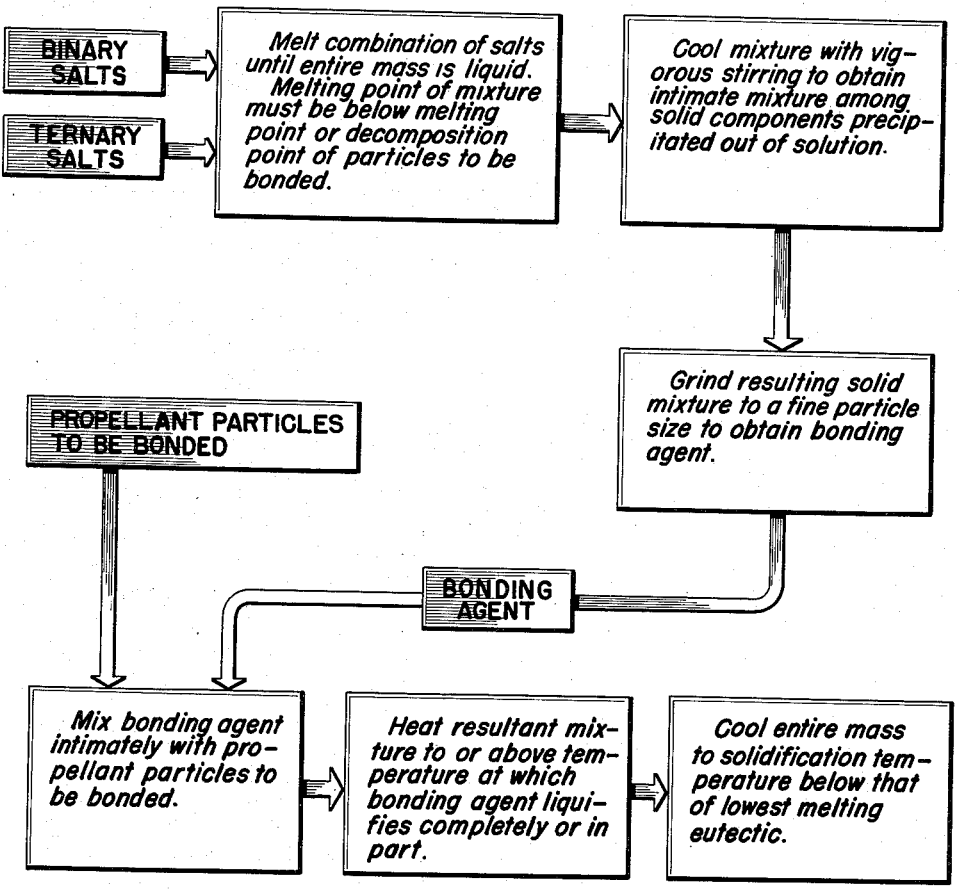

This invention relates generally to rocket propellants, and, in particular, to a new method of bonding solid oxidizer particles together to manufacture propellant charges.

The manufacture of grains of propellants requires techniques by which small particles can be consolidated into a larger mass of adequate strength. In the past, this has been accomplished in a number of different ways, such as: (a) by melting the small particles and solidifying the melt, i.e., casting of high explosives; (b) by dissolving the particles in a solvent which can be removed at a later stage, i.e., production of cellulose nitrate propellants; and (c) by using bonding substances, such as glues, plastics, rubbers, and the like, i.e., the production of jet-assist take-off propellants.

The method outlined under (a) above cannot always be utilized especially when the temperature sensitivity of the particles to be consolidated is critical and when the melting point of the particles to be consolidated is too high to be conveniently reached. The method set forth under (b) likewise has a serious disadvantage because there are certain inorganic substances as well as many organic substances which are not bondable by this method due to lack of suitable solvents. The use of the method mentioned under (c), wherein organic binders are used, is often undesirable on account of chemical interaction between the binder and the material to be bonded.

It is now proposed to overcome the disadvantages of the above mentioned methods by the use of low melting eutectic bonding agents or mixtures of salts having a composition near the eutectic point.

It is the principal object of this invention, therefore, to disclose a new method of bonding solid oxidizer particles together in order that the particles can be consolidated into a larger mass of propellant grain of adequate strength.

Another object of the invention is to disclose a method of bonding powdered materials into a solid mass by the use of low melting salt mixtures.

It is another important object of the invention to provide a method of bonding powdered materials into a solid mass by the use of a low melting salt mitxure, such that the low melting salt mixture that is to be utilized in the process, is chosen from a family of low melting salt mixtures so that one or all of the constituents of the material to be bonded shows solubility in the chosen low melting salt mixture.

And another object of the invention is to provide a method for producing the bonding agent which is subsequently used to bond the propellant particles together.

These and other objects of the invention will be apparent from the following description and claim, taken in connection with the accompanying schematic drawing of the steps of the process.

In accordance with the invention, there is provided a method of bonding powdered materials into a solid mass by the use of low melting salt mixtures. This is achieved by intimately mixing a salt mixture with the material to be bonded, raising the mixture to a temperature above the melting point of the salt mixture, and then cooling the mixture below the solidification temperature of the lowest melting eutectic.

The bonding agent is composed of a binary or ternary mixture of inorganic salts, the melting point of the mixture being below the melting or decomposition point of the particles to be bonded. The bonding agent is prepared by melting the combination of salts until the entire mass is liquid, cooling it with vigorous stirring in order to obtain an intimate mixture among the solid components precipitating out of solution, and grinding the resulting solid mixture to a fine particle size.

The bonding agent so prepared is intimately mixed with the particles to be bonded. The resulting mixture is raised to or above the temperature at which the bonding agent liquifies completely or in part and the entire mass is then allowed to cool below the solidification temperature of the lowest melting eutectic. If the particles to be bonded are soluble in the bonding agent, a fraction of them will dissolve in the liquid bonding agent, the amount dissolved being a function of the temperature at which the mixture is held and the solubility relation of the system.

A working example will now be given. The consolidation of potassium perchlorate particles is effected by adding to the finely divided material approximately 5–15% of the finely ground eutectic mixture composed of potassium perchlorate and sodium nitrate. The potassium perchlorate and the eutectic are mixed together intimately and subjected, under pressure, to a temperature in excess of the melting point of the eutectic, but below the melting or the decomposition point of the potassium perchlorate. The melting point of potassium perchlorate-sodium nitrate mixture is approximately 420° F. The thermal decomposition temperature of potassium perchlorate is approximately 560° F. Curing temperatures up to 500° F. are adequate to insure melting of the eutectic and partial dissolution of the potassium perchlorate particles in the melt. Upon cooling the bonding agent resolidifies, forming an intimate bond throughout the mass.

In another working example, a low melting mixture of 46 parts by weight of $NaNO_2$ (sodium nitrite) and 54 parts by weight of $KNO_3$ (potassium nitrate) are melted together at 150° C. The mixture is then allowed to cool, and then the solid mixture is ground to a fine mesh. A mixture made up of 15 parts by weight of this eutectic powder, and 85 parts by weight of $KClO_4$ (potassium perchlorate) are mixed together as a dry powder, and are then heated and cooled as previously mentioned. The ultimate composition is:

| | Percent |
|---|---|
| $KClO_4$ | 85 |
| $KNO_3$ | 8.1 |
| $NaNO_2$ | 6.9 |

In a third example, a mixture of 15 parts by weight of $NH_4NO_3$ (ammonium nitrate), and one part by weight of $Mg(NO_3)_2 \cdot 6H_2O$ (magnesium nitrate) is melted as previously indicated. Then one part by weight of $$(NH_4)_2Cr_2O_7$$

(ammonium dichromate) is dissolved carefully in the melt, with stirring at a temperature just above the fusion point. The mixture is then cooled, and ground to a fine powder. Then 16 parts by weight of $NH_4ClO_4$ in powdered form is then mixed with the above mixed salt. The mixture is heated and cooled as previously described. The ultimate composition is:

| | Percent |
|---|---|
| $NH_4ClO_4$ | 48 |
| $NH_4NO_3$ | 45 |
| $Mg(NO_3)_2 \cdot 6H_2O$ | 3 |
| $(NH_4)_2Cr_2O_7$ | 3 |

Obviously many modifications and variations of the present invention are possible in the light of the above teachings. It is therefore to be understood that within the scope of the appended claim the invention may be practiced otherwise than as specifically described.

What is claimed is:

The method of bonding potassium perchlorate particles into a solid mass by utilizing an inorganic oxidizer salt mixture composed of potassium perchlorate and sodium nitrate which forms a eutectic having a melting point lower than said particles to be bonded, comprising, mixing said potassium perchlorate and sodium nitrate salts together to form a salt mixture, melting said salt mixture until the entire mass is a liquid, cooling said salt mixture with vigorous stirring to obtain an intimate mxture between the eutectic and the solid components from the predominate salt precipitated out of solution, grinding the resulting mixture to a fine particle size, intimately mixing said resulting ground mixture with said potassium perchlorate particles to be bonded into a combined mixture, heating said combined mixture to a temperature above the melting point of the eutectic of said salt mixture and below the decomposition temperature of the particles to be bonded, and cooling said combined mixture until complete solidification occurs; whereby the eutectic bonds said potassium perchlorate particles at a lower temperature than the decomposition temperature of said particles.

References Cited in the file of this patent

UNITED STATES PATENTS

| | | |
|---|---|---|
| 512,042 | Maxim | Jan. 2, 1894 |
| 933,060 | Clement et al. | Sept. 7, 1909 |
| 1,568,324 | Dehn | Jan. 5, 1926 |
| 1,671,792 | Stoops | May 29, 1928 |
| 1,908,569 | Stoops | May 9, 1933 |

FOREIGN PATENTS

| | | |
|---|---|---|
| 388,027 | Great Britain | Feb. 14, 1933 |